United States Patent
Jenkner et al.

(10) Patent No.: US 8,810,226 B2
(45) Date of Patent: Aug. 19, 2014

(54) OPERATING A SEMICONDUCTOR COMPONENT HAVING A BREAKTHROUGH VOLTAGE

(75) Inventors: Christian Jenkner, Klagenfurt (AT); Gunther Steinle, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 72 days.

(21) Appl. No.: 13/406,957

(22) Filed: Feb. 28, 2012

(65) Prior Publication Data

US 2012/0223694 A1 Sep. 6, 2012

(30) Foreign Application Priority Data

Mar. 2, 2011 (EP) .................................... 11001706

(51) Int. Cl.
*H02M 3/155* (2006.01)

(52) U.S. Cl.
USPC ........................................................ 323/284

(58) Field of Classification Search
CPC ...... H02M 3/155; H02M 3/156; H02M 3/157
USPC ............................ 323/222, 282, 283, 284, 285
See application file for complete search history.

(56) References Cited

U.S. PATENT DOCUMENTS

| | | | | |
|---|---|---|---|---|
| 7,411,377 | B2 * | 8/2008 | Sutardja et al. | 323/282 |
| 7,554,310 | B2 * | 6/2009 | Chapuis et al. | 323/282 |
| 2003/0122533 | A1 * | 7/2003 | Prescott | 323/313 |
| 2005/0001152 | A1 | 1/2005 | Stewart et al. | |
| 2005/0100349 | A1 | 5/2005 | Kuhara et al. | |
| 2005/0129415 | A1 | 6/2005 | Tang | |

OTHER PUBLICATIONS

Suppan I: "APD-Bias Circuit Has Adjustable Output", EDN Electrical Design News, Reed Business Information, Highlands Ranch, CO, US, vol. 42, No. 11, May 22, 1997, p. 122, XP000725573, ISSN: 0012-7515. 1 Page.
"5-2 Control of dc-dc-converters" In: Ned Mohan, Tore Undeland, William Robbins: "Power Electronics: Converters, Applications and Design", 1989, John Wiley & Sons, XP000002658046, pp. 64-65. 2 Pages.
European Search Report dated Nov. 24, 2011 for European Application No. EP 11001706.8. 7 Pages.

* cited by examiner

*Primary Examiner* — Gary L Laxton
*Assistant Examiner* — Kyle J Moody

(57) ABSTRACT

Methods and apparatuses include operating a semiconductor component using a DC/DC-converter. The DC/DC-converter has its duty cycle controlled. A voltage at the semiconductor component is sensed for a voltage. The duty cycle is controlled or regulated so that the sensed voltage corresponds to a predetermined voltage. The predetermined voltage may be gradually increased until a difference between the sensed voltage and the predetermined voltage reaches a predetermined limit.

12 Claims, 2 Drawing Sheets

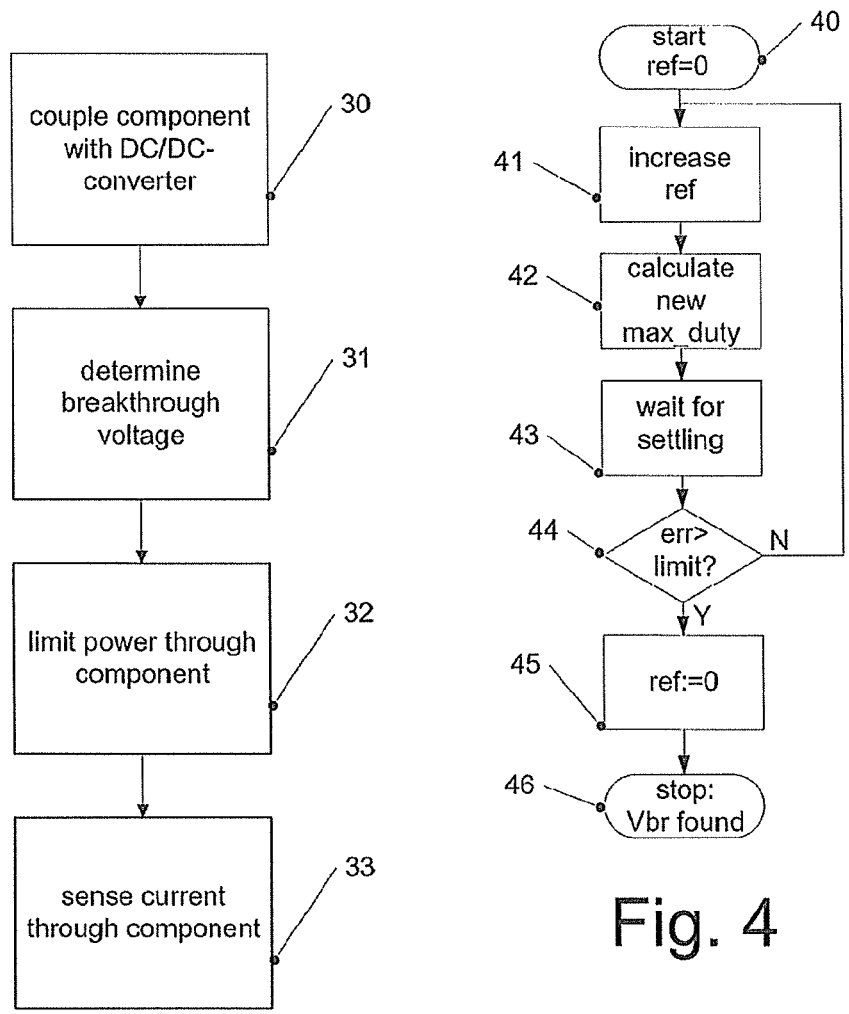
Fig. 3
Fig. 4
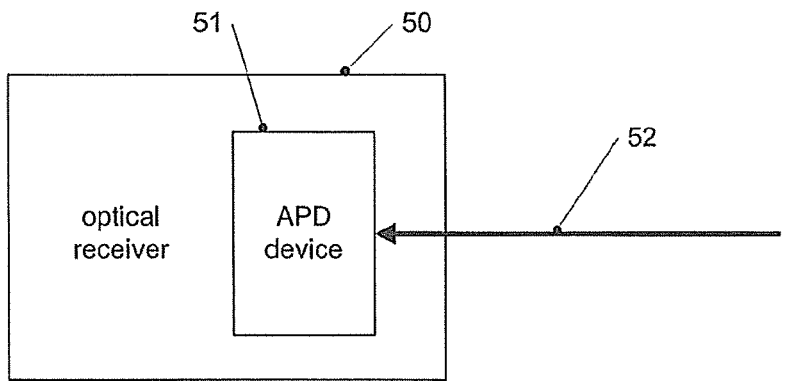
Fig. 5

OPERATING A SEMICONDUCTOR COMPONENT HAVING A BREAKTHROUGH VOLTAGE

REFERENCE TO RELATED APPLICATION

This application claims priority to European Application Number EP 11001706.8 filed on Mar. 2, 2011, which is hereby incorporated by reference in its entirety.

FIELD

The present application relates to apparatuses and methods for operating a semiconductor component having a breakthrough voltage. Operating the semiconductor component may for example include measuring the breakthrough voltage of the component, providing power to the component and/or sensing a current through the component or generated by the component.

BACKGROUND

One example of semiconductor components having a breakthrough voltage are photodiodes (PD), which are semiconductor components used for converting light to an electrical current. Photodiodes are for example used in fiber optic receivers. Such a photodiode in some applications needs to be biased with a voltage that ensures high linearity and responsivity/sensitivity. If such a bias voltage is larger than the breakthrough voltage of the photodiode, a too high, possibly destructive, current may flow through the photodiode.

A specific type of photodiode is an avalanche photodiode. With such avalanche photodiodes (APDs), the bias voltage also controls the so-called avalanche gain in the diode. With common avalanche photodiodes, an optimized sensitivity is usually achieved near the breakthrough voltage, i.e. at the breakthrough voltage minus a constant offset.

Therefore, with such semiconductor components it is helpful to know the breakthrough voltage exactly to optimize the bias voltage while avoiding damage to the component.

Conventionally, the breakthrough voltage may be determined at the production of the semiconductor component using dedicated testing equipment and may for example then be stored in a look-up table. However, the breakthrough voltage may vary with temperature and aging of the component, and therefore a breakthrough voltage determined at production may not be entirely accurate later during use. Therefore, it would be desirable to be able to determine the breakthrough voltage through a (repeatable) calibration, for example in the final system. Furthermore, it would be desirable to provide an efficient way of controlling the bias voltage of such a semiconductor component such that the danger of damaging the component is at least reduced. Furthermore, in case the component is a component like a photodiode the current through which it is measured, it is desirable to provide an easy way of measuring the current and therefore to determine for example a strength of received optical power.

SUMMARY

According to an embodiment, a method is provided, comprising: controlling a duty cycle of a DC/DC-converter for biasing a semiconductor component having a breakthrough voltage.

In some embodiments, by limiting the duty cycle to a maximum value, the power/current supplied to the semiconductor component can be limited, for example during normal use of the component. Therefore, in such embodiments damage to the semiconductor component can be prevented.

Some embodiments further comprise sensing a voltage at the semiconductor component or a voltage derived therefrom, and regulating the duty cycle such that the sensed voltage corresponds to a predetermined voltage. Such embodiments may further comprise gradually increasing the predetermined voltage until a difference between the sensed voltage and the predetermined voltage reaches a predetermined limit. The predetermined voltage when the difference reaches the predetermined limit may be taken as a breakthrough voltage of the semiconductor component, thus performing a calibration.

In a further embodiment, the current through the semiconductor component may be determined based on the duty cycle.

In a further embodiment, an apparatus is provided, comprising a DC/DC-converter, a semiconductor component having a breakthrough voltage and being supplied by the DC/DC-converter and a control circuit coupled with the DC/DC-converter to control a duty cycle thereof.

The apparatus may further comprise a feedback path to provide information regarding the voltage at the semiconductor component to the control circuit.

In an embodiment, the control circuit comprises a combiner configured to combine a voltage which is derived from a voltage at the semiconductor component (which includes the possibility of the voltage being equal to the voltage at the semiconductor component P) with a reference voltage to generate an error signal. The control circuit is further configured to control the duty cycle depending on the error signal, for example by using a PID (proportional integral derivate)-controller which may control a pulse width modulator. The signal output by the pulse width modulator may be fed to a switching transistor of the DC/DC-converter.

In some embodiments, the apparatus, for example the control thereof, may be configured to implement the method of any of the embodiments described above.

Features of the above-mentioned embodiments may be combined with each other unless specifically noted otherwise.

BRIEF DESCRIPTION OF THE DRAWINGS

Further embodiments of the invention will be described with reference to the attached drawings, wherein:

FIG. 3 is a flow chart illustrating a method according to an embodiment;

FIG. 4 is a flow chart illustrating a method according to a further embodiment; and FIG. 5 shows a schematic diagram of a receiver according to an embodiment.

DETAILED DESCRIPTION

Figure 1:
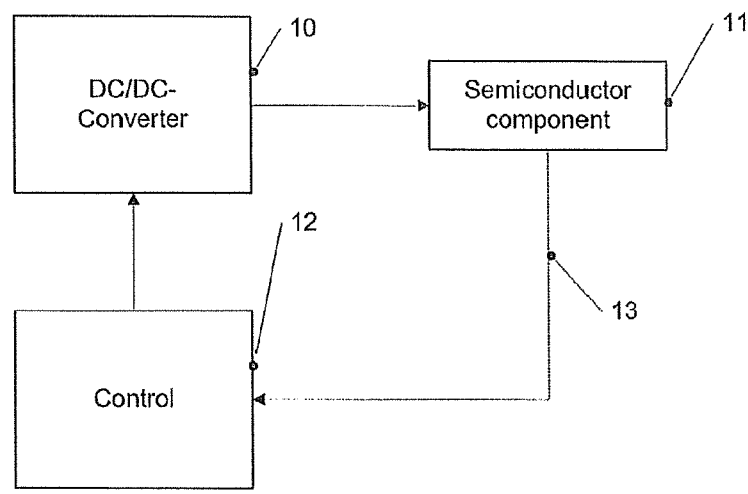
FIG. 1 is a block diagram of an apparatus according to an embodiment.

Various non-limiting embodiments of the present invention will be described with reference to the attached drawings. It is to be understood that the following description is given only for the purpose of illustration and is not to be taken in a limiting sense. The scope of the invention is not intended to be limited by the embodiments described hereinafter.

It is also to be understood that in the following description of embodiments any direct connection or coupling between functional blocks, devices, components, circuit elements or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the description of various functional blocks is intended to give a clear understanding of various functions performed in a device and is not to be construed as indicating that these functional blocks have to be implemented as separate physical units. For example, one or more functional blocks or units may be implemented by programming a processor like a single digital signal processor accordingly or may be implemented in a single integrated circuit.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

In the following, various embodiments involving DC/DC-converters will be described. DC/DC-converters generally are devices, which convert a first DC voltage to a second DC voltage different from the first DC voltage. Certain DC/DC-converters may be operated in a discontinuous mode, sometimes also referred to as switched mode conversion, where input energy from an input voltage source is stored temporarily and then released to the output as a different voltage. The storage may for example use magnetic field storage components like inductors or transformers and/or electrical field storage components like capacitors. In such DC/DC-converters, in a first part of an operating period, the input energy is stored, and in a second part of the period, the energy is released. The time ratio between the first part of the period and the second part of the period is referred to as duty cycle hereinafter.

Furthermore, various embodiments described above involve a semiconductor component having a breakthrough voltage, for example a photodiode like an avalanche photodiode. The breakthrough voltage, sometimes also referred to as the breakdown voltage, is a voltage which potentially damages the semiconductor component and which generally is associated with a certain increase of current flowing via the semiconductor component. While both the terms breakthrough voltage and breakdown voltage are used in the art, to avoid any confusion in the following specification only the term breakthrough voltage will be used, being intended to encompass both terms.

Turning now to the figures, in FIG. 1 a block diagram of an embodiment according to the present invention is shown. The embodiment of FIG. 1 comprises a DC/DC-converter 10, which supplies a voltage, for example a bias voltage, to a semiconductor component 11. Semiconductor component 11 in the embodiment of FIG. 1 is a component having a breakthrough voltage.

Furthermore, the embodiment of FIG. 1 comprises a control 12 (e.g., a controller, a control unit or a control circuit), which is configured to control a duty cycle of DC/DC-converter 10. For example, control 12 may control the duty cycle of DC/DC-converter 10 such that the voltage or power output by DC/DC-converter 10 to semiconductor component 11 does not exceed the breakthrough voltage or a maximum allowed power of semiconductor component 11.

In other embodiments, examples for which will be described later in greater detail, control 12 may gradually vary the duty cycle depending on a voltage and/or current at semiconductor component 11. Information regarding the voltage and/or current at semiconductor 11 may be supplied to control 12 via an (optional) feedback path 13.

In a further embodiment, control 12 may be configured to determine a current flowing via semiconductor component 11 based on the duty cycle. The above-mentioned embodiments may be combined.

Figure 2:
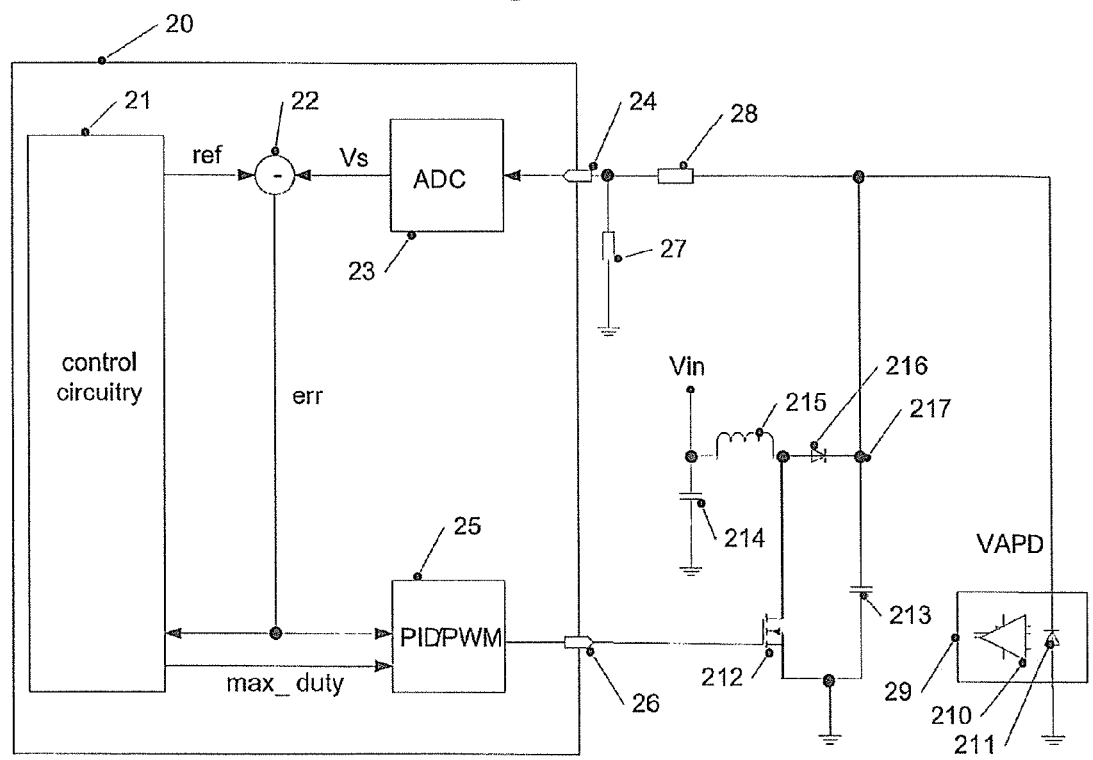
FIG. 2 is a diagram of an apparatus according to a further embodiment.

In FIG. 2, a further embodiment of the present invention is shown. The embodiment of FIG. 2 comprises a control 20. Control 20 comprises a voltage input 24 and a voltage output 26. A voltage fed to voltage input 24 is converted to a digital value by an analog to digital converter (ADC) 23 to form a digital voltage value Vs. The digital value Vs is supplied to a subtractor 22, which is an example of a combiner in one embodiment. Furthermore, a control circuitry 21 which may be implemented as a state machine supplies a digital reference voltage value ref to subtractor 22. Subtractor 22 outputs the difference between ref and Vs as an error signal err.

Error signal err is fed to control circuitry 21 and is furthermore fed to a controller/pulse width modulator 25 which outputs a pulse width modulated voltage signal at voltage output 26 the duty cycle of which depends on error signal err.

In the embodiment of FIG. 2, control circuitry 21 furthermore supplies a maximum value for the duty cycle labelled max_duty in FIG. 2 to controller/pulse width modulator 25.

The voltage signal having a duty cycle, which is output at voltage output 26, is fed to a DC/DC-converter to control the duty cycle of the DC/DC-converter accordingly. In the example of FIG. 2, the DC/DC-converter comprises a switching transistor 212, a capacitance 213, a capacitance 214, an inductance 215 and a diode 216 that are generally coupled between an input voltage Vin and ground as shown in FIG. 2. 217 designates an output node of the DC/DC-converter. In particular, voltage output 26 is coupled to a gate input of switching transistor 212. In the embodiment of FIG. 2, the voltage at output 26 based on the duty cycle varies between a voltage turning switching transistor 212 on, i.e. making it conducting between its source and drain terminals, and turning switching transistor 212 off, i.e. making it non-conducting between its source and drain terminals. When switching transistor 212 is turned on, current may flow between the input voltage Vin and ground via inductance 215, thus storing energy in inductance 215. When switching transistor 212 is turned off, the stored energy is discharged via diode 200 to output node 217. Diode 216 prevents a "flowing back" of energy into the DC/DC-converter.

Output node 217 is coupled to an avalanche photodiode 211, which is an example for a semiconductor component and which in the embodiment shown is integrated with an amplifier 210 in a package 29. However, in other embodiments a semiconductor component without an amplifier may be provided. The voltage applied to avalanche photodiode 211 is labelled VAPD in FIG. 2 and may serve as a biasing voltage for avalanche photodiode 211. Furthermore, in the embodiment of FIG. 2, the voltage VAPD is fed back to the voltage input 24 of control 20 via a resistor 28 and a further resistor 27 serving as voltage divider to reduce the voltage. Nevertheless, although the voltage is reduced, the voltage at input 24 is proportional to the voltage VAPD and is therefore a measure for voltage VAPD.

In some modes of operation, controller/pulse width modulator 25 controls the duty cycle such that the error signal err is minimized, i.e. brought at least approximately to zero, meaning that Vs is approximately equal to ref. Such a regulation in some embodiments may be used to determine the breakthrough voltage of avalanche photodiode 211. Moreover, by choosing max_duty appropriately based on a maximum non-destructive current allowed through the avalanche photodiode that is based on the breakthrough voltage, the current can be limited below this value, thus protecting avalanche photodiode 211.

Generally, the relationship between input power, load power and peak value through the inductance 215 and diode 216, is $$\frac{P_{VN}}{\eta * f_{SW}} = \frac{L * I_p^2}{2} \quad (1)$$

wherein $P_{VN}$ is the load power during a conversion cycle, i.e. during one period of the pulse width modulated signal output at voltage output 26, η is a factor for taking non-linearity and losses into account, $f_{SW}$ is the switching frequency of the pulse width modulated signal and therefore of the DC/DC-converter, L is the inductance 215 and $I_p$ is the peak value of the current through inductance 215 and diode 216.

Therefore, for a given maximum $P_{VN}$ the maximum current $I_p$ is given by $$I_p = \sqrt{\frac{2 * P_{VN}}{L * \eta * f_{SW}}}. \quad (2)$$

The duty cycle necessary for a maximum current $I_p$ can be calculated as:

$$\text{duty cycle} = f_{SW} \cdot \frac{I_p \cdot L}{Vin}, \quad (3)$$

wherein Vin is the input voltage of the DC/DC-converter.

In FIG. 3, a flow chart illustrating a method according to an embodiment is shown. The method of FIG. 3 may for example be implemented using the apparatus shown in FIG. 1 or using the apparatus shown in FIG. 2, but may also be implemented independently therefrom.

At 30, a semiconductor component having a breakthrough voltage is coupled with a DC/DC-converter. For example, component 11 of FIG. 1 may be coupled with DC/DC-converter 10 of FIG. 1, or component 211 of FIG. 2 may be coupled with DC/DC-converter 212-217 of FIG. 2.

At 31, the breakthrough voltage of the semiconductor component is determined, for example by varying a duty cycle of the DC/DC-converter. An example for such a determination of a breakthrough voltage will later be described in more detail with reference to FIG. 4.

At 32, the power through the component is limited by limiting the duty cycle of the DC/DC-converter. For example, the limit may be chosen depending on the breakthrough voltage determined at 31 or based on specifications provided by a manufacturer of the semiconductor component. The power may be limited by limiting the current through the duty cycle as per the above equations (1)-(3).

At 33, a current through the semiconductor component is sensed depending on the duty cycle. As explained with respect to the above equations (1)-(3), the current and the duty cycle are related. For example, the duty cycle to current relationship may be calibrated through a calibration measurement, and then the current can be determined depending on the duty cycle for example by using a look-up table. In case the semiconductor component is a photodiode like an avalanche photodiode, the calibration may be made using a light source having a defined power, and then the power of an arbitrary light source can be determined based on the current duty cycle. Therefore, a received signal strength for example in an optical receiver can be determined for example using a state machine, for example control circuitry 21 of FIG. 2, in an efficient way.

It should be noted that the various actions described with respect to 30-33 may be implemented independently from each other, and in some cases only one or two of these items may be implemented in a given embodiment. Moreover, the various actions may be performed in parallel or in a different order than shown in FIG. 3.

Next, with reference to FIG. 4 an embodiment of a method for determining a breakthrough value of a semiconductor component using a variation of a duty cycle of a DC/DC-converter is shown. The method of FIG. 4 may be implemented in the embodiment of FIG. 2 and will be explained with reference thereto, although a corresponding method can also be implemented in another apparatus comprising a DC/DC-converter and some kind of feedback, as for example shown in FIG. 1.

At 40, the method is started and a reference voltage value ref like the value ref of FIG. 2 is set to zero. At 41, ref is increased, and at 42 a new maximum duty cycle max_duty is calculated based on the reference value ref. In an embodiment, the maximum duty cycle max_duty is calculated such that the semiconductor component is not damaged given the reference voltage ref and therefore the voltage to be applied to the semiconductor component depending therefrom.

At 43, a wait occurs until a corresponding control loop is settled; in the example of FIG. 2 until the error signal err is stationary, for example approximating zero. At 44, it is checked whether the value err exceeds a predetermined limit. If this is not the case, the method jumps back to 41, i.e. the reference value is further increased. If this is the case, at 45 the reference value is reset to zero, and the voltage corresponding to the last duty cycle, i.e. the duty cycle when the error exceeded the limit at 44, is taken as breakthrough value of the semiconductor component.

The basis for the method of FIG. 4 is, as already mentioned above, that when the breakthrough voltage is reached the current suddenly increases. In this case, the necessary current to reduce the error to zero or approximately zero cannot be reached any more without violating the maximum duty cycle max_duty, which is an indication that the breakthrough voltage has been reached.

To give a specific example, below values for the maximum duty cycle for an avalanche photodiode tolerating a maximum current of 1 mA for a switching frequency $f_{SW}$ of 1 MHz, an inductance 215 of 4.7 pH, an input voltage Vin of 3.3 V and a value η of 0.5 are given.

| $V_{out}$ | duty_max |
|---|---|
| 10 V | 34 |
| 15 V | 41 |
| 20 V | 47 |
| 25 V | 53 |
| 30 V | 58 |
| 35 V | 63 |
| 40 V | 67 |
| 45 V | 71 |

| $V_{out}$ | duty_max |
|---|---|
| 50 V | 75 |
| 55 V | 79 |

In the above table, $V_{out}$ represents the output voltage of the DC/DC-converter, and duty_max is the maximum duty cycle represented as an 8 bit value.

The above numerical values of course are to be seen only as an example for a specific application with a specific component being a specific avalanche photodiode to give further illustration and are not to be construed as limiting.

In FIG. 5, an optical receiver according to an embodiment is shown. The optical receiver 50 of FIG. 5 comprises an avalanche photodiode (APD) device 51 for receiving optical signals via an optical communication channel 52. The APD device 51 in the embodiment shown comprises a DC/DC-converter for biasing the avalanche photodiode and may be implemented as shown in FIG. 1 or 2.

It should be noted that the above embodiments are to be seen as examples only, as a plurality of variations and alterations are possible within the scope of the present invention, some of which already have been explained above and some of which will be further explained below. For example, while in the embodiment of FIG. 2 a specific DC/DC-converter is shown, in other embodiments other types of DC/DC-converters operating in discontinuous mode, for example DC/DC-converters using capacitances as energy storage may be used. Furthermore, instead of field effect transistor 212, a different kind of switch may be used. Also, FIG. 2 shows a specific implementation of control 20, and other types of controls may be used. For example, while in FIG. 2 control 20 combines a digital reference value ref with a digital sensed value Vs, in other embodiments analog values may be combined and fed to an analog input of a controller which then controls a pulse width modulator. Also, the present application is not only applicable to avalanche photodiodes, but also to other kinds of semiconductor components having a breakthrough voltage.

What is claimed is:

1. A method, comprising:
controlling a duty cycle of a DC/DC-converter to generate a bias voltage;
biasing a semiconductor based component with the bias voltage, wherein a value of the bias voltage prevents the semiconductor based component from exceeding a breakthrough voltage thereof,
wherein controlling the duty cycle comprises:
combining a second value depending on a voltage at the semiconductor component with a reference value to generate an error value;
determining a first value of the duty cycle of the DC/DC-converter based on the error value; and
setting the duty cycle to a second value of the duty cycle by limiting the value of the duty cycle of the DC/DC-converter to a predetermined value, wherein the predetermined value is determined by:
stepwise increasing the reference value until the error value exceeds a predetermined limit;
taking an output voltage of the DC/DC-converter at a time when the error value exceeds the predetermined limit as the breakthrough voltage of the semiconductor component; and
setting the predetermined value to be less than a third value of the duty cycle associated with the error value exceeding the predetermined limit.

2. The method of claim 1, further comprising determining the predetermined value based on a maximum current supported by the semiconductor based component.

3. The method of claim 1, wherein the semiconductor based component is a photodiode.

4. An apparatus, comprising:
a DC/DC-converter;
a semiconductor component having a breakthrough voltage, wherein an output of the DC/DC-converter is coupled to the semiconductor component and provides a bias voltage thereto; and
a control circuit configured to control a duty cycle of the DC/DC-converter to prevent the bias voltage from exceeding the breakthrough voltage of the semiconductor component, wherein the control circuit comprises:
a combiner having a first input coupled to a control input, a second input coupled to a reference value, wherein the combiner is configured to output an error signal having an error value based on values at the first input and the second input; and
a controller configured to generate a duty cycle control signal to control the duty cycle of the DC/DC-converter to a first value based on the error signal and further configured to set the duty cycle to a second value by limiting the duty cycle of the DC/DC-converter to a predetermined value, wherein the predetermined value is determined by:
stepwise increasing the reference value until the error value exceeds a predetermined limit;
taking an output voltage of the DC/DC-converter at a time when the error value exceeds the predetermined limit as the breakthrough voltage of the semiconductor component; and
setting the predetermined value to be less than a third value of the duty cycle associated with the error value exceeding the predetermined limit.

5. The apparatus of claim 4, further comprising a feedback path coupling the semiconductor component to a control input of the control circuit.

6. The apparatus of claim 5, wherein the feedback path comprises a voltage divider.

7. The apparatus of claim 4, wherein the DC/DC-converter comprises a transistor, wherein a control output of the control circuit is coupled to a transistor control input of the transistor to thereby control the duty cycle by controlling a switching of the transistor.

8. A circuit, comprising:
a DC/DC converter configured to generate a bias voltage based on an internal duty cycle thereof;
a semiconductor component having a breakthrough voltage associated therewith, wherein the semiconductor component receives the bias voltage; and
a control circuit configured to control the internal duty cycle of the DC/DC converter to prevent the bias voltage from exceeding the breakthough voltage of the semiconductor component, wherein the control circuit comprises:
a combiner configured to generate an error signal based upon a difference between a reference signal and a feedback signal; and
a controller configured to generate a pulse width modulation signal having a duty cycle of a first value based on the error signal, wherein the pulse width modulation signal dictates the internal duty cycle of the DC/DC converter, and wherein the control circuit is further configured to identify a predetermined duty cycle of a second value, and prevent the pulse width modulation signal from reaching a third value that exceeds the predetermined duty cycle of the second value, wherein the predetermined duty cycle is determined by:

stepwise increasing the reference value until an error value of the error signal exceeds a predetermined limit;

taking an output voltage of the DC/DC-converter at a time when the error value exceeds the predetermined limit as the breakthrough voltage of the semiconductor component; and setting the predetermined value to be less than the third value of the duty cycle associated with the error value exceeding the predetermined limit.

9. The circuit of claim 8, wherein the control circuit is configured to receive a feedback signal associated with the bias voltage and control the internal duty cycle of the DC/DC converter based thereon.

10. The circuit of claim 9, further comprising a voltage divider circuit configured to receive the feedback signal and generate a divider signal derived therefrom for input to the combiner.

11. The circuit of claim 8, wherein the control circuit is configured to generate the pulse width modulation signal to minimize the error signal.

12. The circuit of claim 8, wherein the predetermined duty cycle is related to a maximum non-destructive current value allowed in the semiconductor component.

* * * * *